US011551279B2

(12) United States Patent
Denthumdas

(10) Patent No.: US 11,551,279 B2
(45) Date of Patent: Jan. 10, 2023

(54) SYSTEMS AND METHODS FOR MAKING VEHICLE PURCHASE RECOMMENDATIONS BASED ON A USER PREFERENCE PROFILE

(71) Applicant: Toyota Motor North America, Inc., Plano, TX (US)

(72) Inventor: Shravanthi Denthumdas, Frisco, TX (US)

(73) Assignee: Toyota Motor North America, Inc., Plano, TX (US)

( * ) Notice: Subject to any disclaimer, the term of this patent is extended or adjusted under 35 U.S.C. 154(b) by 271 days.

(21) Appl. No.: 16/553,783

(22) Filed: Aug. 28, 2019

(65) Prior Publication Data
US 2021/0065275 A1 Mar. 4, 2021

(51) Int. Cl.
*G06Q 30/00* (2012.01)
*G06Q 30/06* (2012.01)
*B60K 35/00* (2006.01)

(52) U.S. Cl.
CPC ........ *G06Q 30/0631* (2013.01); *B60K 35/00* (2013.01); *G06Q 30/0627* (2013.01); *G06Q 30/0629* (2013.01); *B60K 2370/161* (2019.05)

(58) Field of Classification Search
CPC .......... G06Q 30/0631; G06Q 30/0629; G06Q 30/0627; B60K 35/00; B60K 2370/161
See application file for complete search history.

(56) References Cited

U.S. PATENT DOCUMENTS

| 8,694,328 | B1* | 4/2014 | Gormley | G06Q 30/0621 |
| | | | | 705/26.7 |
| 9,373,203 | B1* | 6/2016 | Fields | B60W 40/09 |
| 9,820,108 | B1 | 11/2017 | Inciong et al. | |
| 2004/0128224 | A1* | 7/2004 | Dabney | G06Q 40/00 |
| | | | | 705/37 |
| 2010/0223158 | A1* | 9/2010 | Brown | G06Q 10/04 |
| | | | | 705/26.1 |
| 2014/0129080 | A1* | 5/2014 | Leibowitz | B60R 16/0231 |
| | | | | 705/26.7 |
| 2015/0030998 | A1* | 1/2015 | Liu | B60R 99/00 |
| | | | | 434/62 |

(Continued)

FOREIGN PATENT DOCUMENTS

WO 2015189434 A1 12/2015

OTHER PUBLICATIONS

Horrey, William J., Christopher D. Wickens, and Kyle P. Consalus. "Modeling drivers' visual attention allocation while interacting with in-vehicle technologies." Journal of Experimental Psychology: Applied 12.2 (2006): 67. (Year: 2006).*

*Primary Examiner* — Matthew E Zimmerman
(74) *Attorney, Agent, or Firm* — Dinsmore & Shohl LLP

(57) ABSTRACT

A vehicle includes a system for recording and analyzing user preferences during a vehicle test drive. The system includes a processor and a memory that stores processor-readable instructions. When executed by the processor, the processor-readable instructions cause the system to: determine a user identity; create a user preference profile based on the user identity; communicate a prerecorded message describing one or more vehicle options to the user; record a user response of the user in response to the prerecorded message; analyze the recorded user response; and update the user preference profile based on the analysis of the recorded user response.

18 Claims, 6 Drawing Sheets

(56) References Cited

U.S. PATENT DOCUMENTS

| | | |
|---|---|---|
| 2016/0198306 A1 | 7/2016 | Miles et al. |
| 2017/0337573 A1 | 11/2017 | Toprak et al. |
| 2019/0152386 A1* | 5/2019 | McQuillen ............ G07C 5/0808 |

* cited by examiner

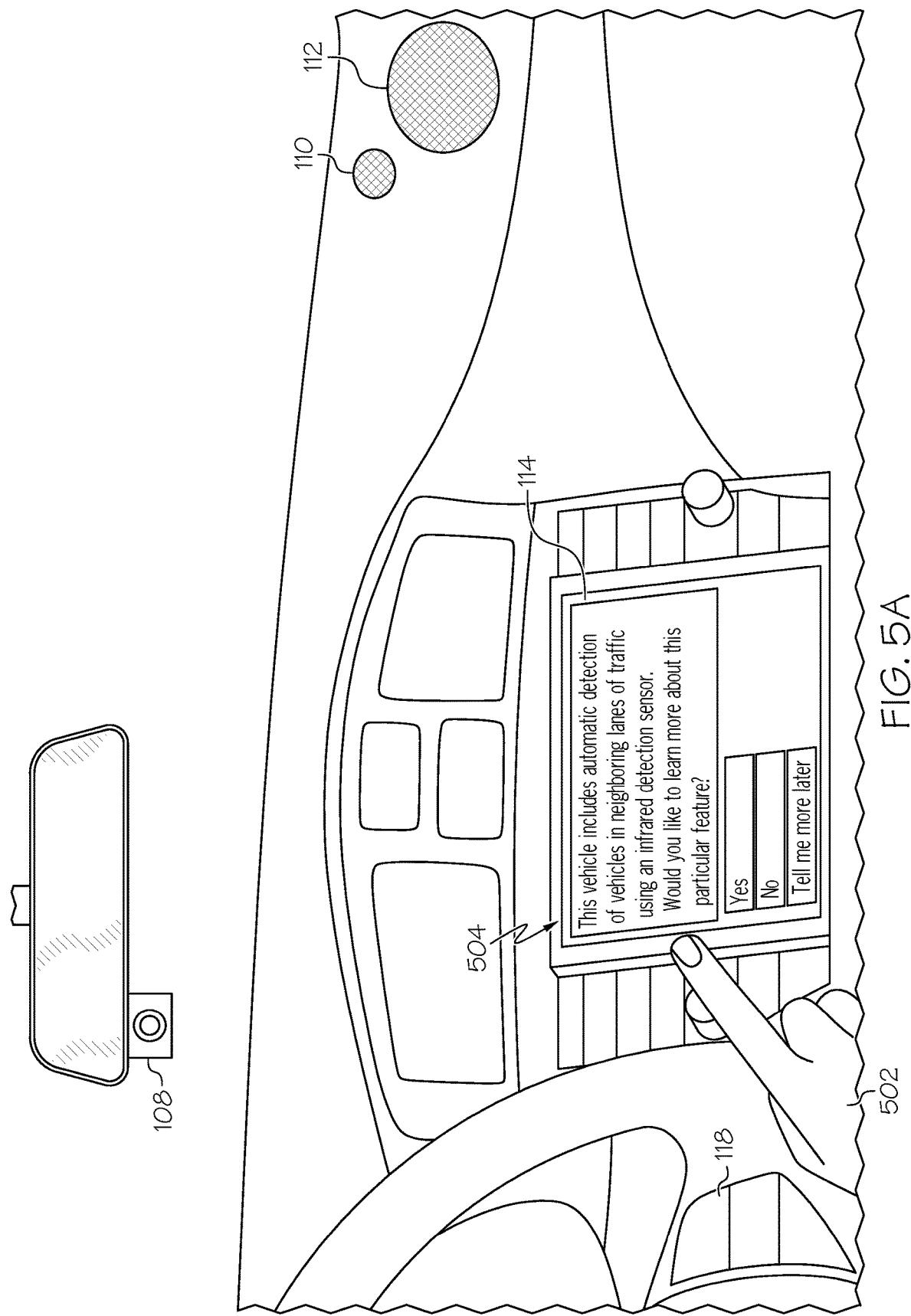

SYSTEMS AND METHODS FOR MAKING VEHICLE PURCHASE RECOMMENDATIONS BASED ON A USER PREFERENCE PROFILE

TECHNICAL FIELD

The present specification generally relates to systems and methods for determining user preferences and more specifically to systems and methods for making vehicle purchase recommendations based on a user preference profile.

BACKGROUND

Vehicles of a particular make or model may have multiple packages of options to choose from or may have customizable options. Users may have preferences for a given options package or for particular options, but may not have sufficient information regarding the availability of a vehicle that includes the given options package or the particular options. Accordingly, systems and methods for making vehicle purchase recommendations based on a user preference profile are desired.

SUMMARY

In one embodiment, a vehicle includes a system for recording and analyzing user preferences during a vehicle test drive. The system includes a processor and a memory that stores processor-readable instructions. When executed by the processor, the processor-readable instructions cause the system to: determine a user identity; create a user preference profile based on the user identity; communicate a prerecorded message describing one or more vehicle options to the user; record a user response of the user in response to the prerecorded message; analyze the recorded user response; and update the user preference profile based on the analysis of the recorded user response.

In another embodiment, a system for recording and analyzing user preferences includes a processor and a memory that stores processor-readable instructions. When executed by the processor, the processor-readable instructions cause the system to: determine a user identity; create a user preference profile based on the user identity; communicate a prerecorded message describing one or more vehicle options to the user; record a user response of the user in response to the prerecorded message; analyze the recorded user response; and update the user preference profile based on the analysis of the recorded user response.

In yet another embodiment, a method of determining user preferences for one or more vehicle options includes determining a user identity of a user; communicating a prerecorded message describing one or more vehicle options to the user; recording a user response of the user in response to the prerecorded message; and analyzing the recorded user response to generate a user preference profile that includes one or more preferred vehicle options.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5A depicts a display including a graphical user interface (GUI) including an inquiry directed at a user of the system of FIG. 1, according to one or more embodiments shown and described herein.

DETAILED DESCRIPTION

Vehicles may include one or more systems that foster interaction with the vehicle and its systems. For example, a vehicle may include sensors, such as cameras and microphones, which capture data on the inside of a cabin of the vehicle. Additionally, a vehicle may include one or more displays, speakers, or other systems for displaying media to a passenger inside the cabin. The sensors may record a passenger's response to the media as data and store such data locally or remotely. This data may be used for a number of purposes, such as interacting with software and hardware systems of the vehicle, causing particular systems to operate or effecting vehicle functionality, and other purposes. In some instances, data recorded by internal sensors may be analyzed during a vehicle test drive or during some other interaction between a potential buyer and the vehicle. Such analysis may be used to make more informed vehicle recommendations to the potential buyer. Such informed recommendations may increase the chance that a potential buyer will actually purchase the vehicle, save a potential buyer and sales staff time and effort, and ultimately improve the vehicle purchasing experience for all those involved in the process of buying and selling a vehicle.

In some cases, vehicle systems may observe and record a potential purchaser (also referred to herein as a "user") and other vehicle passengers during a vehicle test drive to determine their reaction to various vehicle features. For example, when test driving a vehicle, a user may indicate one or more preferences for particular vehicle options. Indeed, by simply selecting a vehicle to test drive, a user may be revealing information about their vehicle and vehicle feature preferences. This data may be captured and utilized to make recommendations or other direct advertisements (e.g., targeted advertisements) to the user to increase the likelihood of presenting a user with a vehicle or other option or group of options that piques his or her interests and persuades him or her to purchase a particular vehicle, upgrade, or group of upgrades.

In some instances, vehicles may include one or more systems for observing the behavior of a user preinstalled on the vehicle. For example, vehicle cabins may include one or more cameras, speakers, touchscreen displays, and other interactive sensors that may be used to observe the behavior of a vehicle user. These sensors may be used to capture data and the data may be processed and/or recorded to maintain a database of user preferences. A user profile may be built and associated with an individually identifying marker, such as a driver's license number. The user profile may be stored and updated over the course of buying a vehicle or vehicles in order to track a user's preferences and make useful recommendations to the user shortening the vehicle selection time and reducing the effort required to match a user with a vehicle.

Figure 1:
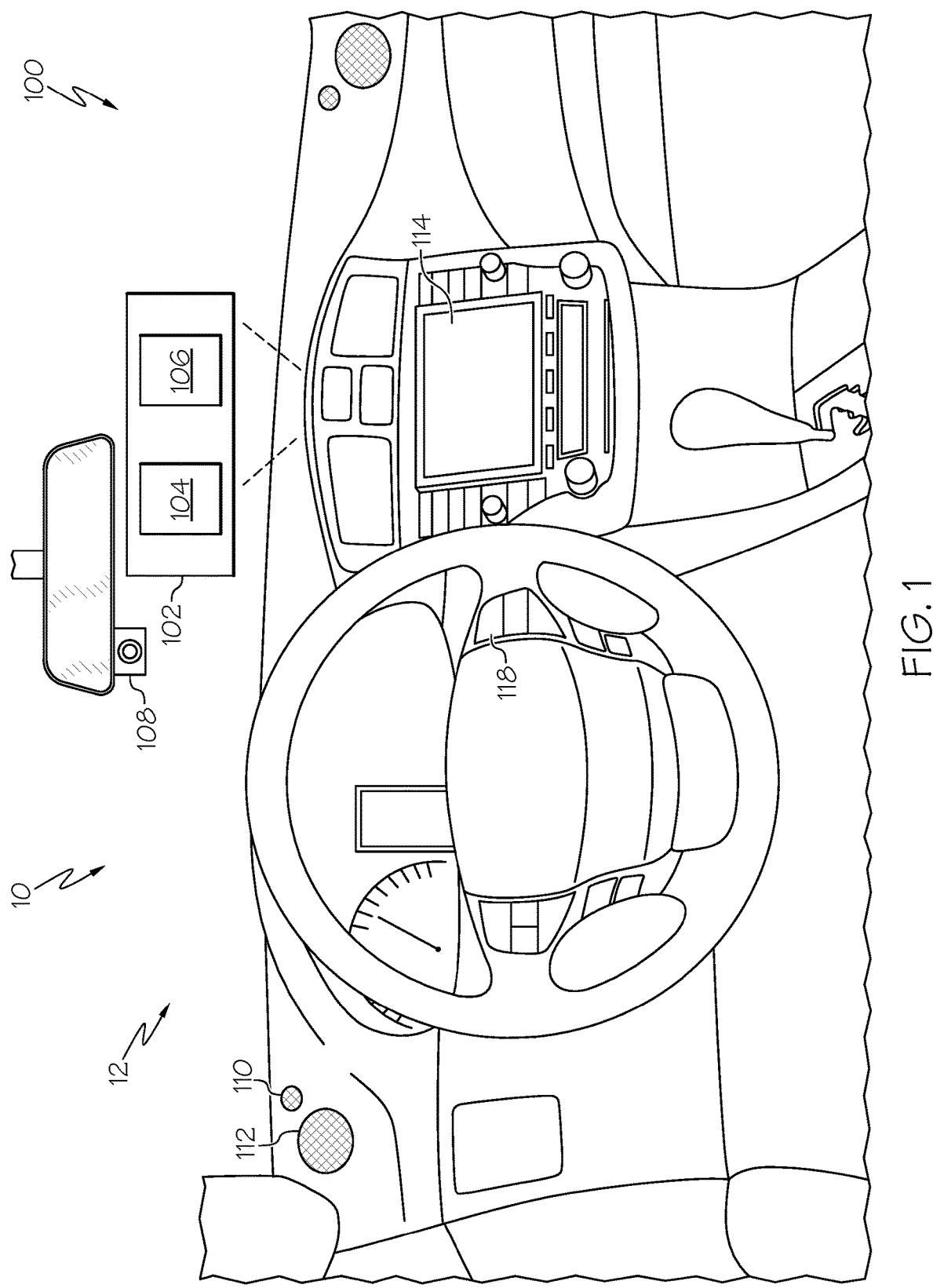
FIG. 1 depicts components of a system for making vehicle purchase recommendations based on a user preference profile, according to one or more embodiments shown and described herein.

Referring now to FIG. 1, a system 100 for making vehicle purchase recommendations based on a user preference profile is shown. The system 100 includes an electronic control unit 102 including a processor 104 and a memory module 106 for storing one or more processor-readable instructions. The system 100 includes a camera 108, a microphone 110, a speaker 112, a display 114, and an input device 118. One or more components of the system 100 are housed within a cabin 12 of a vehicle 10. Various components of the system 100 may be used to record data and inform one or more user preference profiles of one or more users of the vehicle 10 (e.g., test drivers of the vehicle 10). It is to be understood that the system 100 and the vehicle 10 can include any of the features or systems described herein and that the system 100 and the vehicle 10 may not include all of the features or systems described herein.

Figure 2:
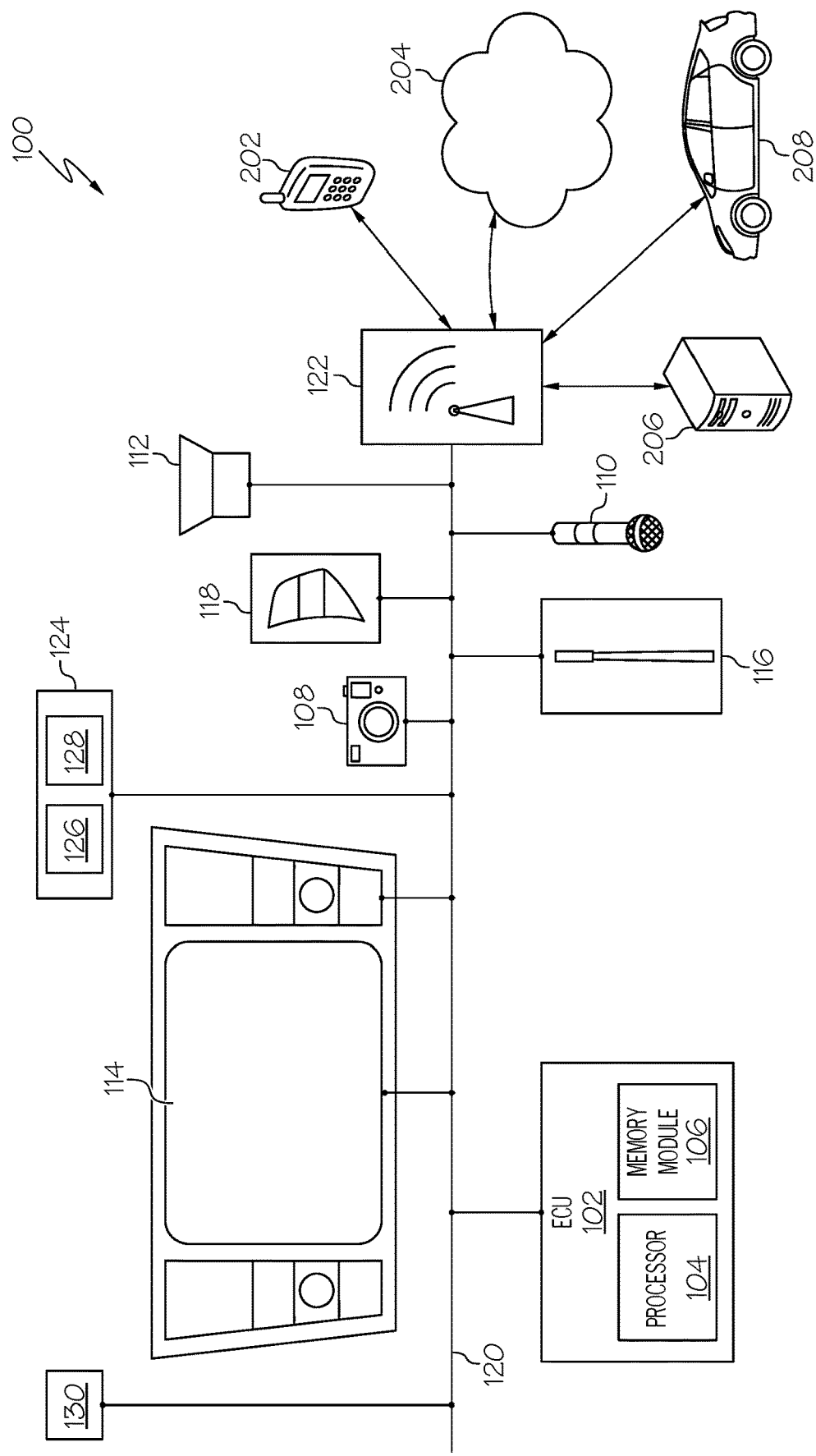
FIG. 2 depicts additional components of a system for making vehicle purchase recommendations based on a user preference profile, according to one or more embodiments shown and described herein.

Referring now to FIG. 2, a schematic of the system 100 onboard the vehicle 10 is shown. The electronic control unit 102 including the processor 104 and the memory module 106, the camera 108, the microphone 110, the speaker 112, the display 114, and the input device 118 may be connected by a bus 120. Additionally, the system 100 may include position locating hardware 116. Additionally, network interface hardware 122 may be connected to the bus 120 and the network interface hardware 122 may connect one or more components of the vehicle 10 to an external network. For example, the network interface hardware 122 may connect the vehicle 10 to a cellular network 202, a cloud network 204, an external server 206, and/or one or more other vehicles such as a second vehicle 208. The system 100 may also include a test drive assistance module 124, which may include test drive media 126 and response analysis logic 128. Some embodiments of the system 100 may include a recommendation module 130.

Referring generally to FIGS. 1 and 2, components of the system 100 will be described in greater detail. As noted above, the system 100 includes the bus 120. The bus 120 may be formed from any medium that is capable of transmitting a signal such as, for example, conductive wires, conductive traces, optical waveguides, or the like. Moreover, the bus 120 may be formed from a combination of mediums capable of transmitting signals. In one embodiment, the bus 120 comprises a combination of conductive traces, conductive wires, connectors, and buses that cooperate to permit the transmission of electrical data signals to components such as processors, memories, sensors, input devices, output devices, and communication devices. Accordingly, the bus 120 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The bus 120 communicatively couples the various components of the system 100. As used herein, the term "communicatively coupled" means that coupled components are capable of exchanging data signals with one another such as, for example, electrical signals via conductive medium, electromagnetic signals via air, optical signals via optical waveguides, and the like.

As noted above, the system 100 includes the electronic control unit 102. The electronic control unit 102 includes the processor 104. It is to be understood that the system 100 may include one or more processors similar to the processor 104. The processor 104 may be any device capable of executing processor-readable instructions. Accordingly, the processor 104 may be a controller, an integrated circuit, a microchip, a computer, or any other computing device. The processor 104 is communicatively coupled to the other components of the system 100 by the bus 120. Accordingly, the bus 120 may communicatively couple any number of processors with one another, and allow the modules coupled to the bus 120 to operate in a distributed computing environment. Specifically, each of the modules may operate as a node that may send and/or receive data.

As noted above, the system 100 includes the memory module 106. The memory module 106 is coupled to the bus 120 and communicatively coupled to the processor 104. The memory module 106 may comprise RAM, ROM, flash memories, hard drives, or any device capable of storing processor-readable instructions such that the processor-readable instructions may be accessed and executed by the processor 104. The processor-readable instructions may comprise logic or algorithm(s) written in any programming language of any generation (e.g., 1GL, 2GL, 3GL, 4GL, or 5GL) such as, for example, machine language that may be directly executed by the processor 104, or assembly language, object-oriented programming (OOP), scripting languages, microcode, etc., that may be compiled or assembled into processor-readable instructions and stored on the memory module 106. In some embodiments, the processor-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The camera 108 is coupled to the bus 120. It is to be understood that the system 100 may include one or more cameras 108 and that, while FIG. 1 shows only a single camera 108 that is attached to a rear view mirror, one or more cameras could be located at various positions within the vehicle 10 without limitation. The camera 108 is coupled to the bus 120 and communicatively coupled to the processor 104. Each camera 108 may be any device having an array of sensing devices capable of detecting radiation in an ultraviolet wavelength band, a visible light wavelength band, or an infrared wavelength band. Each camera 108 may have any resolution. The camera 108 may include an omni-directional camera, or a panoramic camera. In some embodiments, one or more optical components, such as a mirror, fish-eye lens, or any other type of lens may be optically coupled to the camera 108. The camera 108 may be located inside the vehicle 10 to capture image data of the occupants in the vehicle 10 and the image data may be used to identify the occupants of the vehicle 10 and/or record the reaction of the occupants to various vehicle features as will be described in greater detail herein.

In operation, the camera 108 captures image data and communicates the image data to the system 100 and/or to other systems communicatively coupled to the bus 120. The image data may be received by the processor 104, which may process the image data using one or more image processing algorithms. Any known or yet-to-be developed video and image processing algorithms may be applied to the image data in order to identify an item, situation, or person. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms. In some embodiments, image data including images of the occupants of the vehicle is processed to determine an identity of the occupant as described in greater detail herein. For example, camera-captured biometrics (facial recognition technology, finger print scanning, eye scanning, etc.) may be utilized to identify and/or authenticate the identity of an occupant of the vehicle.

In some embodiments, data captured by the camera 108 may be used to identify the user and/or other passengers of the vehicle 10. For example, an initial image or images of the user may be captured by the camera 108 and stored (e.g., in the memory module 106) and the stored images may be compared to subsequent images to identify the user. In some embodiments, an image on a photo identification card, such as a driver's license or a state-issued identification card may be used as an initial image to identify a user and/or other passengers of the vehicle 10.

As noted above, the system 100 comprises the microphone 110 for transforming acoustic vibrations received by the microphone 110 into a speech input signal. The microphone 110 is coupled to the bus 120 and communicatively coupled to the processor 104. As will be described in further detail below, the processor 104 may process speech and other input signals received from the microphone 110 and/or extract information from such signals. The microphone 110 may be used to record audio data from the user and/or other passengers of the vehicle 10 and such recorded data may be used to identify the user and/or other passengers of the vehicle 10. For example, the user's voice may be recorded and stored (e.g., in the memory module 106) as a marker to identify the user in subsequent audio recordings captured by the system 100. Accordingly, a user's identification by the system 100 may be based on one or more audio recordings of the user's voice.

As noted above, the system 100 includes the speaker 112 for transforming data signals from the system 100 into mechanical vibrations, such as in order to output audible prompts or audible information from the system 100. The speaker 112 is coupled to the bus 120 and communicatively coupled to the processor 104.

The system 100 comprises the display 114 for providing visual output such as, for example, messages and other information, entertainment, maps, navigation, information, or a combination thereof. The display 114 is coupled to the bus 120 and communicatively coupled to the processor 104. Accordingly, the bus 120 communicatively couples the display 114 to other modules of the system 100. The display 114 may include any medium capable of transmitting an optical output such as, for example, a cathode ray tube, light emitting diodes, a liquid crystal display, a plasma display, or the like. Moreover, the display 114 may be a touchscreen that, in addition to providing optical information, detects the presence and location of a tactile input upon a surface of or adjacent to the display. Accordingly, each display 114 may receive mechanical input directly upon the optical output provided by the display. Additionally, it is noted that the display 114 may include at least one processor similar to the processor 104 and one memory module similar to the memory module 106. While the system 100 includes a display 114 in the depicted embodiment, the system 100 may include multiple displays or may not include a display 114 in other embodiments, such as embodiments in which the system 100 provides exclusively audible feedback via the speaker 112.

As noted above, the system 100 optionally includes position locating hardware 116. The position locating hardware 116 may be coupled to the bus 120 such that the bus 120 communicatively couples the position locating hardware 116 to other modules of the system 100. The position locating hardware 116 is configured to receive signals from global positioning system satellites or other position locating devices (e.g., cell network towers, GPS transponders, etc.). Specifically, in one embodiment, the position locating hardware 116 includes one or more conductive elements that interact with electromagnetic signals transmitted by global positioning system satellites. The received signal is transformed into a data signal indicative of the location (e.g., latitude and longitude) of the position locating hardware 116 or an object positioned near the position locating hardware 116, by the processor 104. In embodiments where the system 100 is coupled to a vehicle, the processor 104 may execute machine readable instructions to transform the global positioning satellite signals or other signals received by the position locating hardware 116 into data indicative of the current location of the vehicle 10. While the system 100 includes the position locating hardware 116 in the embodiment depicted in FIG. 2, the system 100 may not include the position locating hardware 116 in other embodiments, such as embodiments in which the system 100 does not utilize global positioning satellite information or embodiments in which the system 100 obtains global positioning satellite information from a mobile device or other external device or network.

Additionally, the system 100 comprises the input device 118 coupled to the bus 120 such that the bus 120 communicatively couples the input device 118 to other modules of the system 100. The input device 118 may be any device capable of transforming mechanical, optical, or electrical signals into a data signal capable of being transmitted with the bus 120. Specifically, the input device 118 may include any number of movable objects that each transforms physical motion into a data signal that may be transmitted over the bus 120 such as, for example, a button, a switch, a knob, a microphone or the like.

While the input device 118 is depicted in FIG. 1 as separate tactile input hardware, it is to be understood that in some embodiments, the input device 118 is a touch screen and the display 114 and the input device 118 may be combined as a single module and operate as an audio head unit or an infotainment system. However, it is noted, that the display 114 and the input device 118 may be separate from one another and may each operate as a single module by exchanging signals via the bus 120. While the system 100 includes input device 118 in the embodiment depicted in FIG. 2, the system 100 may not include input device 118 in other embodiments, such as embodiments that only include the display 114 or in embodiments that do not include the display 114.

As noted above, the system 100 includes the network interface hardware 122 for communicatively coupling the system 100 with an external network. The network interface hardware 122 is coupled to the bus 120 such that the bus 120 communicatively couples the network interface hardware 122 to other modules of the system 100. The network interface hardware 122 may be any device capable of transmitting and/or receiving data via a wireless network. Accordingly, the network interface hardware 122 may include a communication transceiver for sending and/or receiving data according to any wireless communication standard. For example, the network interface hardware 122 may include a chipset (e.g., antenna, processors, processor-readable instructions, etc.) to communicate over wireless computer networks such as, for example, wireless fidelity (Wi-Fi), WiMax, Bluetooth®, IrDA, Wireless USB, Z-Wave, ZigBee, or the like. In some embodiments, the network interface hardware 122 includes a Bluetooth® transceiver that enables the system 100 to exchange information with an external network (e.g., a cellular network) or component (e.g., a smartphone) via Bluetooth® communication.

The system 100 may also include the test drive assistance module 124, which may store test drive media 126 and response analysis logic 128. The test drive media 126 may include data, such as a prerecorded message, that may describe, highlight, display, simulate, or otherwise indicate particular vehicle features during a vehicle test drive. For example, the test drive media 126 may include one or more of, in any combination, videos that may show on the display 114, audio messages that may play over the speakers 112, and other lights, sounds, vibrations, and/or other stimuli that may indicate vehicle features, systems, functionality, and other aspects about the vehicle 10, a make/model, a feature, or any other vehicle aspect. The test drive media 126 may play before, during, and/or after a test drive to indicate to a user of the vehicle 10 the aspects of the vehicle 10 that it describes. In some embodiments, the test drive media 126 may include one or more software or hardware applications that may interact with a user's computer or portable device. For example, one or more portions of the test drive media 126 may be embodied as an application on a smart device of the user. In some embodiments, the test drive media 126 may be stored or partially stored as a web-based application and may be accessed or partially accessed via an internet browser (e.g., a website that is accessible by a user remotely). In some embodiments, test drive media 126 may include one or more interactive portions such as interactive videos, interactive images, surveys, questionnaires, or other media that is designed to elicit a response from the user. In some embodiments, the test drive media 126 may include one or more virtual reality environments that are accessible via a virtual reality device.

Additionally, the test drive media 126 on any particular vehicle may be adapted for that vehicle such that it is configured to describe the features on that vehicle. In some embodiments, test drive media 126 may include descriptions of features that are not on the vehicle being tested but that may be on a different vehicle. In such a case, the system 100 may include a disclaimer that such feature or features are not on the vehicle currently being tested, but may be configured to list vehicles that include the feature or features as well as give a location and/or other characteristics of such vehicles. For example, if a user is testing a vehicle that only has an option of two-wheel drive, the test drive media 126 may be configured to inform the user that the option is not currently available on the vehicle being tested but may be configured to list one or more vehicle makes, models, styles having such a feature.

The response analysis logic 128 may include audio input analysis logic (e.g., speech recognition software, etc.), image analysis logic (e.g., facial recognition software, etc.), video analysis logic, and the like. The response analysis logic 128 may include a plurality of different pieces of logic, each of which may be embodied as a computer program, firmware, and/or hardware, as an example. The response analysis logic 128 may be configured to execute one or more language or vocabulary recognition algorithms using an audible input received from one or more sources, such as the microphone 110, network interface hardware 122, or a personal electronic device of one or more vehicle occupants. In some embodiments, the response analysis logic 128 may be configured to generate responses to message or speech input, such as by causing audible sequences to be output by the speaker 112 or causing imagery to be provided to the display 114, as will be described in further detail below.

In some embodiments, the response analysis logic 128 may be configured to determine a user dwell time on a particular feature, feature package, option, option package, or other vehicle aspect or aspects. A user dwell time is the amount of time that a user spends considering the particular aspect. For example, if a user is informed of the ability to automatically increase and/or decrease a cruise control "set" speed by tapping a button on the display 114 and the user spends 30 seconds increasing and/or decreasing the cruise control speed using the appropriate button and then indicates a desire to hear about more features or shifts his or her attention to the next described feature, the user dwell time on the particular feature may be 30 seconds. In some embodiments, user dwell time may be considered continuously. In other embodiments, one or more factors external to the user may be considered when determining the user dwell time. For example, if the user is stopped at a red light and one or more features is being described during the stop, the user dwell time may cease to count when the vehicle begins to move again as the user's attention is ostensibly on accelerating. The user dwell time may begin to count again if the user returns to the feature after the vehicle has accelerated. In some embodiments, non-consecutive user dwell times may be summed even after extended breaks in considering a vehicle feature. For example, a user may direct the system 100 to return to a description of a particular feature or features and once the system 100 has returned to such a feature or features, the user dwell time may begin again to recalculate. For example, a user may request the system 100 to: "Tell me more about the satellite radio feature," while an AM/FM radio is being described. In such a case, the system 100 may cease calculating a user dwell time for the AM/FM radio feature and may begin determining a user dwell time for the satellite radio feature again.

In some embodiments, dwell time may be aspect specific. That is, if a user interacts with a particular vehicle aspect in a certain way, the dwell time for that aspect may be calculated specifically. For example, a user may interact with a display 114 differently than the user interacts with speakers 112. That is, a user views visual signals displayed on the display and listens to audible signals played through the speakers. Accordingly, the system 100 may be configured to calculate a dwell time in accordance with the main functionality of a particular aspect. For example, if the user interacts with the test drive media 126 such that the speakers 112 play music throughout the entire test drive, the user's preference profile may be updated with a substantial dwell time based on the amount of time the user spent listening to the speakers 112. As another example, if a user's gaze leaves a display 114 while the user is driving but goes to a display 114 at every opportunity (e.g., at a red light or a stop sign), the dwell time for the display 114 may be calculated as substantially higher than average and the user's preference profile may be updated to reflect an interest in visual media or other visual interfaces on the display 114 such that vehicles with higher performance visual media can be offered to the user, for example.

The recommendation module 130 may be configured to determine a user's response to various vehicle features and to develop a user preference profile based on the response to the displayed vehicle features. User preference profile information may include information regarding any type of vehicle option. For example, user preference profile information may include information about user preference for body type (e.g., SUV, sedan, compact, etc.), about mechanical characteristics of the vehicle such as drive train type (e.g., four-wheel drive, two-wheel drive, etc.), engine size (e.g., V-8, V-6, etc.), towing capacity/capability, cargo capacity, and other characteristics. User preference profile information may include information about a user's preference for vehicle efficiency such as miles-per-gallon (MPG), propulsion type (e.g., gasoline, electric, etc.), speed, acceleration, and braking capacity. User preference profile information may include aesthetic information such as preference for particular upholstery options, seat/mirror heating, automatic seats, automatic mirrors, sun roofs, moon roofs, etc. User preference profile information may include preference information with respect to entertainment options such as display size, speaker quality, audio options (e.g., satellite, FM/AM radio, disc players, etc.), Bluetooth® compatibility, navigation equipment, etc.

Additionally, the recommendation module 130 may be configured to generate or access data from a pool of available vehicle options or pool of available vehicles. The pool of available vehicle options may include information regarding all of the features on cars within any particular set of vehicles as sorted based on various criteria. The criteria for building the pool of vehicle options and vehicles may be customizable based on customer search preferences. For example, the pool of available vehicle options and vehicles may be selectively limited to include features on vehicles within a particular radius of the user's location. In some embodiments, the pool of available vehicle options and vehicles may be selectively limited based on a make, model, or style of vehicle. In some embodiments, the pool of available vehicle options and vehicles may be selectively limited based on one or more vehicle features, options, or other aspects (e.g., color, size, drive type, etc.).

Figure 3:
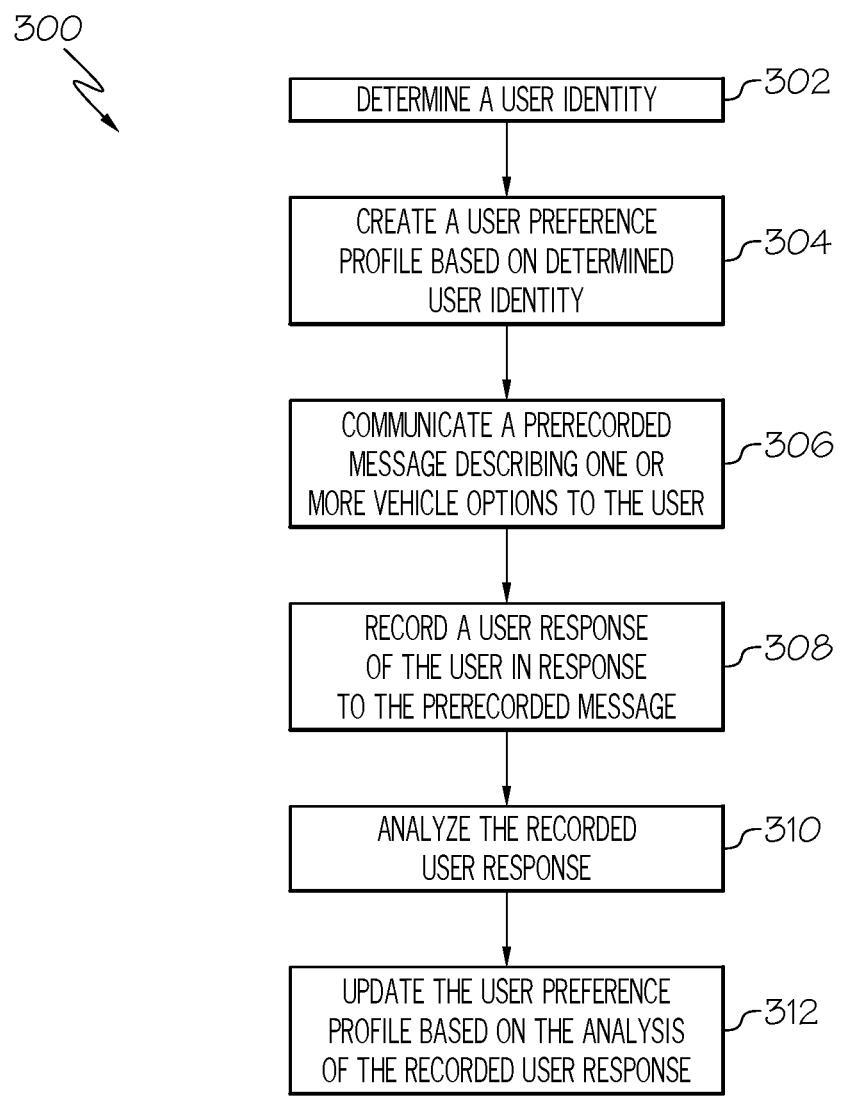
FIG. 3 depicts a method of making vehicle purchase recommendations based on a user preference profile, according to one or more embodiments shown and described herein.

Referring now to FIG. 3, one embodiment of a method for making vehicle purchase recommendations based on a user preference profile using the system 100 described in FIGS. 1 and 2 is described. It is to be understood that the method depicted in FIG. 3 is merely one embodiment of such a method and that other methods of making vehicle purchase recommendations are within the scope of the present disclosure.

At step 302, the system 100 determines a user identity. The user may be a test driver of the vehicle 10, a passenger of the vehicle 10, or some other individual interested in purchasing a vehicle. The user may be identified using the camera 108 within the vehicle 10. For example, an image of the user may be captured and analyzed and the user identified using image recognition software as described above. In some embodiments, the user may be identified using speech or voice recognition software (e.g., using the microphone 110). In some embodiments, an identity of the user may be known before the user enters the vehicle 10 and may be uploaded to the system 100 via some external means through the network interface hardware 122. For example, a sales associate may identify the user and may input the user's identification information into the system 100 using an application on a smart device, a web server, or the like. In some embodiments, the user may input his or her own information similarly.

In some embodiments, the user's identity may be associated with a driver's license number or other government assigned identification number or symbol. For example, a user's identity may be associated with a driver's license, which is required in order to test drive a vehicle, and each time that user comes to test drive a vehicle, his or her preferences may be stored in conjunction with the driver's license number to ensure that the user preference profile is individual to the correct person (i.e., if two John Smiths want to test drive vehicles, notwithstanding their similar appellation, the two will not have identical driver's license numbers). The user's identifying information may be entered into the system 100 (e.g., a staff member or sales associate may enter the user's driver's license number and/or other identifying information into the system 100) and the subsequently recorded user preference profile information may be associated with such identifying information.

Once the user's identity has been determined, a user preference profile may be created for the particular user at step 304. The user's preferences may be saved to the user preference profile as the user interacts with the vehicle features, functionality, and other aspects of the vehicle. The user preference profile may be saved locally to the vehicle 10 or may be saved externally from the vehicle 10 on some other portion of the system 100. For example, the user preference profile may be saved on an external network such as the cloud network 204. In some embodiments, the system 100 may update the user preference profile in real time as the test drive occurs. In other embodiments, a working profile may be saved locally to the vehicle 10 and the user preference profile may be updated when the vehicle 10 is in communication with an external network, such as the cloud network 204. In some embodiments, the user preference profile may be saved on a mobile computing device of a sales associate and may be updated manually by the sales associate based on one or more observations of the sales associate during a test drive. For example, a sales associate may ask questions of the user during a test drive and may update a user preference profile based on responses from the user.

Once the user preference profile has been created, the system 100 may communicate a prerecorded message describing one or more vehicle options to the user at step 306. The prerecorded message may be stored in the test drive media 126, for example, and may include one or more videos, audio files, signs, images, sounds, vibrations, or other stimuli that may indicate or describe the presence, location, functionality, or other aspect of a vehicle option or feature. For example, the prerecorded message used to indicate satellite radio functionality in a vehicle that includes satellite radio capability may highlight the button or button combination that is used to initiate the streaming of satellite radio over the speakers within the vehicle. In another example, a video demonstrating how to shift a particular make and model vehicle from two-wheel drive to four-wheel drive may play on the display 114. The prerecorded message may include detailed instructions. In some embodiments, the prerecorded message may indicate the presence of a feature or features without instructing the user how to use such a feature. For example, the prerecorded message may inform the user that the vehicle has heated seats without instructing the user how to activate the heated seats. The prerecorded message may be stored locally on the vehicle or may be stored remotely and uploaded to the vehicle before or during a vehicle test drive. For example, the prerecorded message data may be sent to the vehicle 10 using the network interface hardware 122 as a test drive is in progress.

At step 308, the system 100 may record a user response of the user in response to the prerecorded message. The system 100 may record the user response using the camera 108, the microphone 110, the display 114, the input device 118, or using some other feature for receiving input from the user. For example, during or after the prerecorded message plays, the camera 108 may visually record the user's response to the prerecorded message. This visual data may be stored locally at the vehicle 10 or may be sent externally and stored remotely.

In some embodiments, the one or more aspects of the response may be recorded by a sales associate. For example, the sales associate may record a user's reaction to various features using a mobile computing device. The sales associate recording may be used to supplement or in place of a recording by the system 100. Additionally, a sales associate may record one or more responses to questions (e.g., survey questions) that the sales associate, another employee, the vehicle 10, or some other entity may ask the user. In some embodiments, the content of the prerecorded message may be based on an input from a sales associate (e.g., an employee of a car dealership that is selling the vehicle 10). The content may be customizable based on the user's interest in particular features as observed by the sales associate. For example, if the sales associate determines that the user is connecting with one or more features in particular, the sales associate may interact with the system 100 to indicate the user's interest in such a feature causing the option or feature to be emphasized to the user.

In some embodiments, recording the user response to the prerecorded message may include recording a user dwell time spent considering one or more of the one or more vehicle options. Dwell time generally refers to the amount of time that a user spends considering, manipulating, experiencing, and/or interacting with a particular option, feature, or other aspect of the vehicle. Dwell time may be determined by, for example, analysis of data received by one or more of the vehicle-borne sensors, such as the camera 108, the microphone 110, the display 114, and/or the input device 118. Dwell time may be determined by one or more user actions, e.g., touching a radio button or looking at the speakers. Dwell time may be determined based on user oral communications, e.g. if the user says, "Tell me more about the FM radio functionality." In some embodiments, the dwell time may be the most heavily weighted factor when determining a user preference profile as described in more detail herein. In some embodiments, the dwell time may be the only factor when determining a user preference profile as described in more detail herein. In some embodiments, the dwell time is standardized based on the average dwell time that all user's spend considering a particular option, feature, or other aspect of a particular vehicle, class of vehicles, style of vehicles, or other classification of vehicles. In some embodiments, the dwell time that all users who test drive a four-wheel-drive SUV spend considering the four-wheel-drive feature may be averaged across a fleet of SUVs. For example, all the SUVs built and sold by Carmaker A and test driven by various users over the course of a given time period (e.g., a calendar year, calendar month, etc.) may be averaged to determine how important this particular feature is to any given user or group of users. The amount of time that any particular user spends may be compared to the amount of time that all users or a group of users spends considering this feature to determine the relative importance of this feature to the particular user. Additionally, the amount of time that users spend considering a first feature or group of features may be compared to the amount of time that users spend considering a second feature or group of features and this data may be used to determine the relative importance of a feature or group of features to user's as a whole.

At step 310, the system 100 may analyze the recorded user response to update the user preference profile. The system 100 may utilize an image or sound analysis or recognition algorithm to perform the analysis. For example, the system 100 may utilize a deep learning or machine learning data structure. The system 100 may use one or more image recognition algorithms, such as, but not limited to content-based image classification, shape and/or pattern recognition analysis, feature fusion, higher-order local autocorrelation, weighted principal component analysis, facial expression measuring, k-nearest neighbor algorithms, k-mean algorithms, clustering large algorithm based on randomized search (CLARANS), and the like. The system 100 may include one or more image databases for comparison to the images captured by the camera 108. Additionally, the system 100 may use one or more sound recognition algorithms or pattern recognition networks, for example, neural machine translation networks, recurrent neural networks, Hidden Markov models, phoneme context dependency models, cepstral normalization, vocal tract length normalization, maximum likelihood linear regression, heteroscedastic linear discriminant analysis, discriminative training techniques including maximum mutual information, minimum classification error, and minimum phone error, Viterbi algorithms, dynamic time warping, end-to-end automatic speech recognition, and the like. In some embodiments, the user response may include one or more selections at a user interface (e.g., a graphical user interface (GUI)) such as a GUI displayed on the display 114. For example, a question may be displayed on the display asking the user, "Do you prefer a vehicle with a sunroof?" The user may be given one or more options to respond, such as, without limitation, "Yes," "No," or "This doesn't matter to me." These exemplary text-based questions are merely examples and not intended as limiting the scope of the questions and/or responses that may be asked of and received from a user. For example, the user may be shown a series of pictures and asked to select which he or she prefers. In some embodiments, a user may be shown a video that compares one or more vehicles and asked to select the preferred options. In some embodiments, user feedback to questions may be open ended, and may be receivable in multiple forms. For example, user responses may be typed, spoken, selected from a number of options, etc.

At step 312, the system 100 may update the user preference profile based on the analysis of the recorded user response. The user preference profile data may be stored, for example, on the memory module 106 and the user preference profile data may be updated as the test drive occurs and the user indicates his or her preferences. In some embodiments, the user preference profile data may be stored locally at the vehicle 10 and may be updated on an external server based on a condition of the vehicle 10, for example, a proximity of the vehicle 10 to an external server or connectivity with an external network. In some embodiments, the user preference profile may be updated each time a user comes in for a test drive. For example, the user may test drive several vehicles over a period of months and the user's preference profile may be updated several times over the period of months (e.g., each time new information is received from the user regarding his or her preferences). In some embodiments, the analysis of the recorded user response may be merely one input to the update of the user preference profile. For example, the user preference profile may be updated based on other user data (e.g., survey data in response to an email solicitation, etc.). In some embodiments, user data may be stored on a smart device of a sales associate and the user preference profile may be updated based on inputs from the sales associate.

Figure 4:
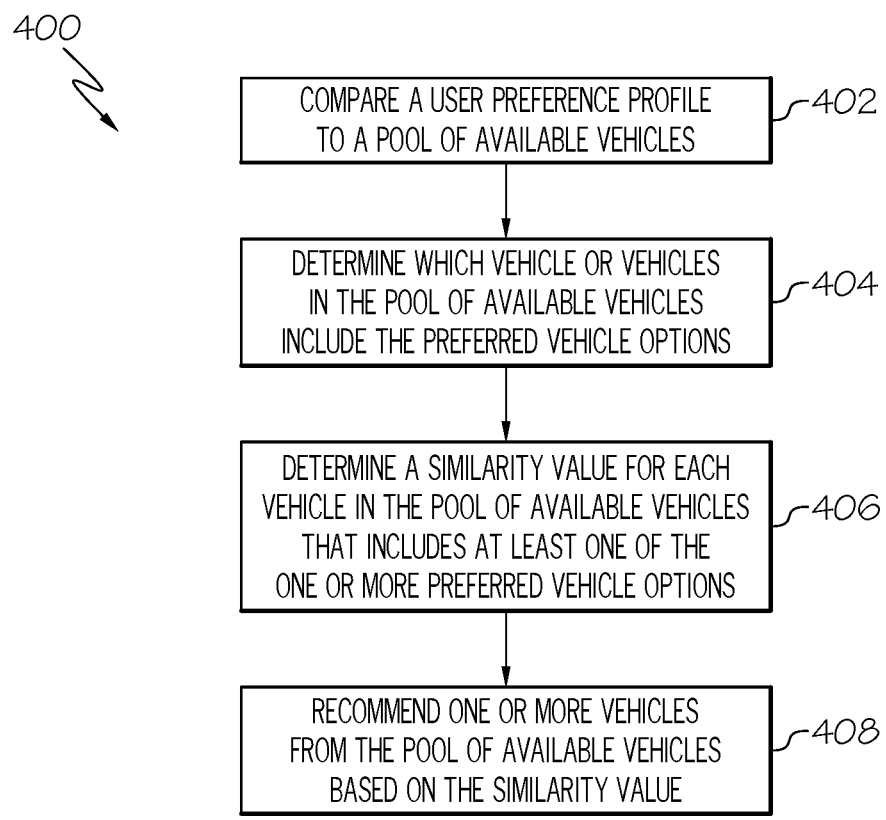
FIG. 4 depicts another method of making vehicle purchase recommendations based on a user preference profile, according to one or more embodiments shown and described herein.

Referring now to FIG. 4, a method for recommending one or more vehicles from a pool of available vehicles based on one or more preferred vehicle options is shown. The preferred vehicle options may be the user's preferences with respect to various vehicle options, features, aspects, characteristics, and other criteria of vehicles. Preferred vehicle options may include, as non-limiting examples, information about user preference for body type (e.g., SUV, sedan, compact, etc.), about mechanical characteristics of the vehicle such as drive train type (e.g., four-wheel drive, two-wheel drive, etc.), engine size (e.g., V-8, V-6, etc.), towing capacity/capability, cargo capacity, and other characteristics. Preferred vehicle option information may include information about vehicle efficiency such as miles-per-gallon (MPG), propulsion type (e.g., gasoline, electric, etc.), speed, acceleration, and braking capacity. Preferred vehicle option information may include aesthetic information such as preference for particular upholstery options, seat/mirror heating, automatic seats, automatic mirrors, sun roofs, moon roofs, etc. Additionally, preferred vehicle option information may include preference information with respect to entertainment options such as display size, speaker quality, audio options (e.g., satellite, FM/AM radio, disc players, etc.), Bluetooth® compatibility, navigation equipment, etc. Preferred vehicle options may be stored, for example, in the recommendation module 130 (e.g., in a lookup table or other data table). In some embodiments, preferred vehicle options may be associated with a particular user identity based on personally identifiable information associated with a user, for example, a user's driver's license number or other data associated with the user that is unlikely to be associated with any other person and particularly identifies the user.

At step 402, a user's preference profile may be compared to a pool of available vehicles. The pool of available vehicles may be based on one or more criteria that may be changed based on one or more user preferences and/or sales associate recommendations. For example, the pool of available vehicles may be geographically based. That is, a user may desire to purchase a new vehicle, but may be limited in his or her ability to travel to a distant car dealership to purchase, test, or otherwise determine whether to purchase the distant vehicle. Accordingly, the pool of available vehicles may be limited by filtering out vehicles at any distance away from the present location of the user. This may filter vehicles like the vehicle in the preceding example. Additionally, a user may prefer to filter vehicles based on one or more other criteria. For example, a user may prefer to filter based on miles-per-gallon (MPG), vehicle class, size, type, year, color, or other characteristic or characteristics. Such exclusions may completely remove one or more vehicles from the pool of available vehicles and the pool of available vehicles may decrease accordingly. In some embodiments, a user may remove one or more restrictions to increase the pool of available vehicles.

At step 404, the system 100 may determine which vehicle or vehicles in the pool of available vehicles include the one or more preferred vehicle options. Accordingly, each vehicle in the pool of available vehicles may have details about its class, make, model, and about several or all of its options available in a database. This data is referred to generally herein as "vehicle options data" and includes, among other data, information about the vehicle make, model, class, type, year, etc. The vehicle options data may be stored, for example, in a lookup table, or other database and be accessed by the system 100 to determine which vehicle or vehicles in the pool of available vehicles includes the one or more options desired by the user.

At step 406, the system may determine a similarity value for each vehicle in the pool of available vehicles that includes at least one of the one or more preferred vehicle options. The similarity value of each vehicle in the pool of available vehicles may include a comparison between one or more options on the available vehicle and one or more of the user's preferred vehicle options. A satisfactory score may be generated for each of the available vehicles. For example, a score from 0 to 100 may be generated based on how many of the options on the available vehicle match the user's preferred vehicle options. In some embodiments, the similarity value may be weighted based on particular vehicle options, features, or other aspects. For example, if a particular user has a strong preference for vehicles that include a sunroof, leather seats, and a backup camera, these particular options may be weighted by the system 100 such that vehicles including these particular options are offered to the user first. As another example, certain vehicle options may be used as a filter. For example, if a user will not consider vehicles without a sunroof, leather seats, and a backup camera, the similarity value for all vehicles not including these features may automatically score 0 for all vehicles not including these options. In some embodiments, vehicles without data as to whether they include weighted vehicle options may or may not be displayed to a user.

At step 408, the system 100 may recommend one or more vehicles from the pool of available vehicles based on the similarity value of the particular available vehicle and the user preference profile. The similarity value of the available vehicle may be compared to the user preference profile and the available vehicles may be ranked and presented to the user in ranked order. For example, the similarity value of a first example vehicle may be 100. That is, the first example vehicle may include all of the user's preferred vehicle options. The similarity value of a second example vehicle may be 80. That is, the second example vehicle may include some, but not all, of the user's preferred vehicle options. The similarity value of a third example vehicle may be 23. That is, the third example vehicle may include few, but not all, of the user's preferred vehicle options. Accordingly, the system 100 may recommend one or more of the above-listed example vehicles for purchase to the user.

In some embodiments, the system 100 may include a similarity value threshold such that it does not recommend particular vehicles that do not meet a minimum similarity value. The similarity value threshold may be based on, for example, a sum of all the available options a particular example vehicle includes divided by all of the possible options that the vehicle could include as compared to the user preference profile. In some embodiments, the similarity value threshold may be adjustable based on a user's preference for a particular option, feature, or aspect of a vehicle or group of options, features, or aspects. For example, the similarity value threshold may be weighted based on particular features, such that these features are more important to the calculation of the similarity value threshold. For example, if a particular user wants to see only vehicles with sunroofs, it may be impossible for any available vehicle without a sunroof to meet the similarity value threshold.

Figure 5B:
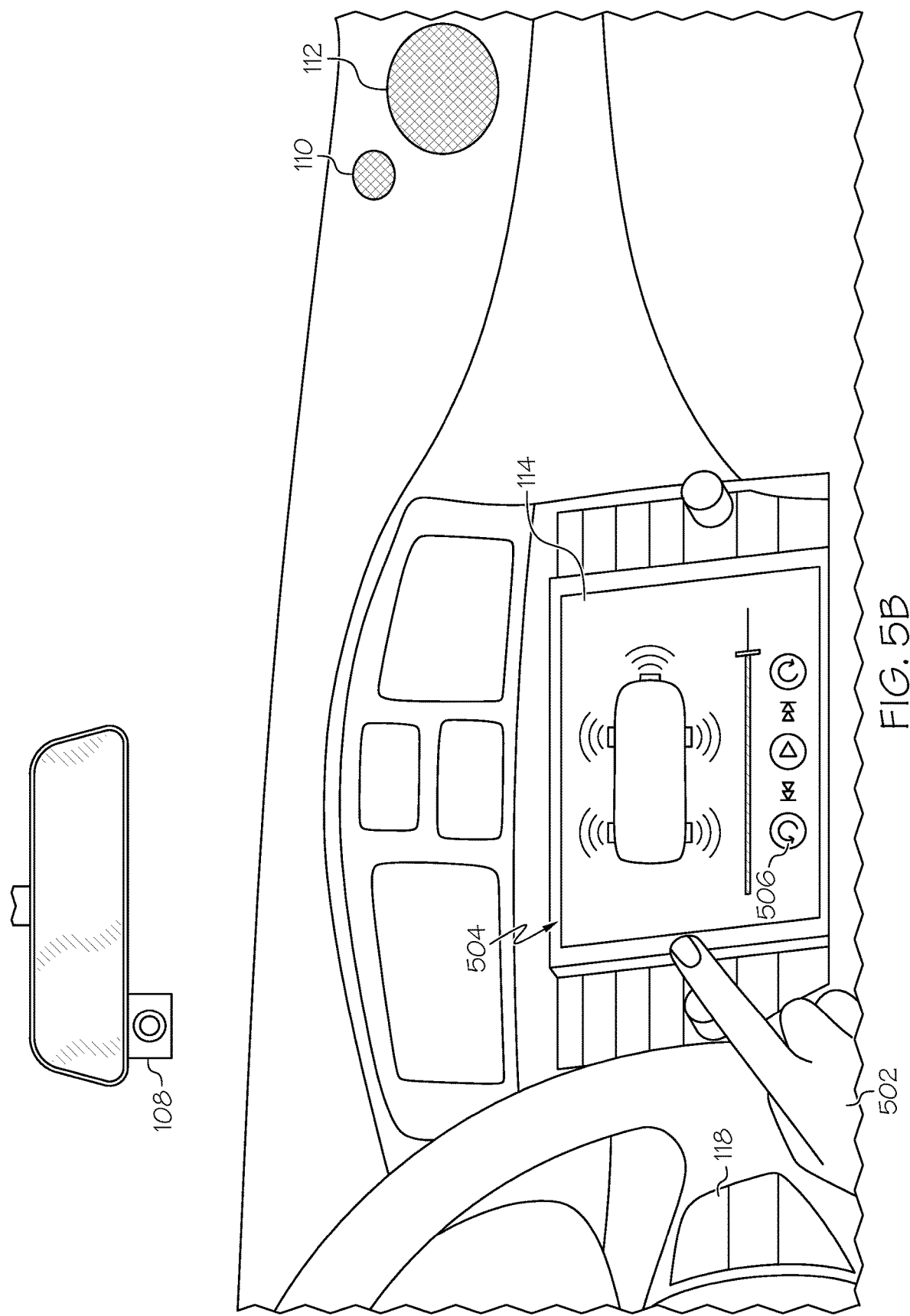
FIG. 5B depicts a display including a GUI depicting a video description of a particular vehicle features that is used, in accordance with other vehicle features described herein, to determine a user's preference for the particular vehicle feature, according to one or more embodiments shown and described herein.

Referring now to FIGS. 5A and 5B, the system 100 will be described with respect to a particular exemplary scenario. FIGS. 5A and 5B show an embodiment of the system 100 that includes the display 114, the microphone, 110, the speaker 112, the camera 108, and an input device 118. The display 114 shows a GUI 504 showing a question that is requesting information regarding the user's preference for a particular feature. In FIG. 5A, the display states, "This vehicle includes automatic detection of vehicles in neighboring lanes of traffic using an infrared detection sensor. Would you like to learn more about this particular feature?"

In this example, the message shown on the display 114 is offering the user to learn more about one particular feature of the vehicle 10. Included on the display 114 are three options: "Yes," "No," and "Tell me more later." In the depicted exemplary embodiment, the user can interact with the system 100 in multiple ways. For example, the user may indicate a preference to learn more about the infrared detection sensor by touching the "Yes" selector on the display 114. Additionally, the user can indicate a preference not to learn more about the particular feature by tapping the "No" selector. The user can delay learning more about the feature by tapping the "Tell me more later" selector. Similarly, the user can speak a reply and the microphone 110. In some embodiments, the input device 118 is configured such that the user can scroll through the available options using an up or a down arrow and then use the input device 118 to select his or her preferred response to the inquiry.

In embodiments, the user's response to the inquiry may be recorded and used to update the user's profile and to make recommendations to the user. For example, if the user answers affirmatively, that is, that he or she would like to learn more about the particular feature in question, the user preference profile may be updated to reflect that this particular user is interested in the subject feature, in this case, infrared detection sensors that can track external vehicles. The user preference profile may subsequently be updated system wide, through an external connection such that systems 100 in subsequently test-driven vehicles know to highlight this particular feature in vehicles. Additionally, the system may know to recommend vehicles including this feature to the user and/or may score vehicles including this feature higher when ranking vehicles to recommend to a user in the future. Conversely, if the user is not interested in this feature and replies that he or she does not want to learn more about this feature, the system 100 may update the user preference profile such that it is less likely to discuss this feature in the future and/or such that vehicles including this feature are not ranked higher based on their inclusion of such a feature.

Still referring to FIGS. 5A and 5B, one or more of the camera 108, the microphone 110, the display 114, and the input device 118 may be used to determine a dwell time of the user on a particular feature. Continuing with the exemplary scenario discussed above, when the system 100 poses the inquiry to the user, the system 100 may begin tracking the response time of the user. For example, the user may reply "Yes" to the inquiry of the system 100 and then be given more information about the infrared detection sensors. In the particular example embodiment shown in FIG. 5B, the system 100 displays a video that explains how the infrared detection sensors work. The display 114 in FIG. 5B shows a video frame (e.g., a media player) including a video describing the infrared detection sensors. The system 100 may track multiple interactions of the user with the display 114 while it displays the media. For example, the camera 108 may track how frequently a user's eyes view the display 114 or may track how long the user's gaze remains focused on the display 114. In other embodiments, the speaker 112 may be used to record a user's vocal expressions during the playing of the video, for example, if the user states, "Oh, that's cool," or makes any other type of comment while watching the video, such response may be used to alter the user preference profile. In some embodiments, the display 114 may track how often the user presses a rewind button 506 on the display 114, which possibly indicates the user's interest in the information contained in the media displayed on the display 114. The system 100 may track how much of the video displayed on the display 114 the user watches to update the user preference profile. For example, if the user only watches a small portion of the video and then is no longer interested in the feature, the user preference profile may be updated reflecting less interest in the feature described in the video. If the user watches a significant portion or all of the video, the user preference profile may be updated accordingly. It is to be understood that the exemplary functionality described herein with respect to the various inputs to the system 100 are merely examples and are not intended to limit the scope of the system 100.

It should now be understood that vehicles may include one or more systems for observing the behavior of a user and that such systems may be used to collect and record user preferences in order to more efficiently recommend vehicles to a user for purchase. For example, vehicles may include one or more cameras, speakers, touchscreen displays, and other interactive sensors that may be used to observe the behavior of a vehicle user. User preferences may be stored in a database and a user profile may be built and associated with individually identifying information, such as a driver's license number. The user profile may be stored and updated over the course of a user buying a vehicle or vehicles in order to track a user's preferences and make useful recommendations to the user, thus shortening the vehicle selection time and reducing the effort required to match a user with a vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle that includes a system for recording and analyzing user preferences during a vehicle test drive, the system comprising:
at least one of a display or a speaker;
a controller programmed to:
communicate, via the at least one of the display or the speaker, a prerecorded message describing one or more vehicle options;
extract one or more objects from a plurality of frames of image data using at least one of a contour processing algorithm and a tracking algorithm;
determine an occupant identity of at least one occupant in a vehicle based on the one or more objects by applying an object recognition algorithm;
in response to the prerecorded message, record a total user dwell time related to the one or more vehicle options, the total user dwell time being obtained based on a summation of a plurality of non-consecutive dwell times related to the one or more vehicle options; and
update a user preference profile associated with the occupant identity based on the total dwell time.

2. The vehicle of claim 1, wherein:
the user preference profile comprises one or more preferred vehicle options, and
the controller is programmed to:
compare the user preference profile to a pool of available vehicles;
determine which vehicles in the pool of available vehicles include the one or more preferred vehicle options; and
recommend one or more vehicles from the pool of available vehicles based on determining that the one or more vehicles include the one or more preferred vehicle options.

3. The vehicle of claim 2, wherein inclusion of a particular vehicle in the pool of available vehicles is based on a geographic location of the particular vehicle.

4. The vehicle of claim 1, wherein the occupant identity is associated with the user preference profile based on a driver's license number of the occupant.

5. The vehicle of claim 4, wherein the prerecorded message is adaptable based on the occupant identity.

6. The vehicle of claim 1, wherein the prerecorded message is adaptable based on the analysis of the recorded total user dwell time.

7. The vehicle of claim 6, wherein the prerecorded message includes a description of at least one vehicle feature.

8. A system for recording and analyzing user preferences, the system comprising:
at least one of a display or a speaker; and
a controller programmed to:
communicate, via the at least one of the display or the speaker, a prerecorded message describing one or more vehicle options;
extract one or more objects from a plurality of frames of image data using at least one of a contour processing algorithm and a tracking algorithm;
determine an occupant identity of at least one occupant in a vehicle based on the one or more objects by applying an object recognition algorithm;
in response to the prerecorded message, record a total user dwell time related to the one or more vehicle options, the total user dwell time being obtained based on a summation of a plurality of non-consecutive dwell times related to the one or more vehicle options; and
update a user preference profile associated with the occupant identity based on the total dwell time.

9. The system of claim 8, wherein
the user preference profile comprises one or more preferred vehicle options, and
the controller is programmed to:
compare the user preference profile to a pool of available vehicles;
determine which vehicles in the pool of available vehicles include the one or more preferred vehicle options;
determine a similarity value for each vehicle in the pool of available vehicles that includes at least one of the one or more preferred vehicle options; and
recommend one or more vehicles from the pool of available vehicles based on the similarity value.

10. The system of claim 9, wherein the controller is further programmed to send user preference profile data to an external network.

11. The system of claim 9, wherein the occupant identity is associated with the user preference profile based on a driver's license number of the occupant.

12. The system of claim 11, wherein the prerecorded message is adaptable based on the occupant identity.

13. A method of determining user preferences for one or more vehicle options comprising:
communicating, via at least one of a display or a speaker, a prerecorded message describing one or more vehicle options;
extracting one or more objects from a plurality of frames of image data using at least one of a contour processing algorithm and a tracking algorithm;
determining an occupant identity of at least one occupant in a vehicle based on the one or more objects by applying an object recognition algorithm;
in response to the prerecorded message, recording a total user dwell time related to one or more vehicle options, the total user dwell time being obtained based on a summation of a plurality of non-consecutive dwell times related to the one or more vehicle options; and
updating a user preference profile associated with the occupant identity based on the total dwell time.

14. The method of claim 13, further comprising:
comparing the user preference profile to a pool of available vehicles;
determining which vehicles in the pool of available vehicles include one or more preferred vehicle options determined based on the user preference profile; and
recommending one or more vehicles from the pool of available vehicles based on determining that the one or more vehicles include the one or more preferred vehicle options.

15. The method of claim 13, further comprising adapting the prerecorded message based on the occupant identity.

16. The method of claim 14, further comprising:
recording a response to the recommendation of the one or more vehicles;
analyzing the recorded response to the recommendation of the one or more vehicles; and
making a second recommendation based on the recorded response to the recommendation of the one or more vehicles.

17. The vehicle of claim 1, further comprising an in-vehicle camera configured to capture an image of the user, wherein the controller is further programmed to determine the user identity based on the image of the occupant.

18. The vehicle of claim 1, wherein the controller is programmed to record a response by:
detecting a selection, of the one or more vehicle options included as part of a user interface output on the display.

\* \* \* \* \*